United States Patent [19]
An

[11] Patent Number: 6,067,033
[45] Date of Patent: *May 23, 2000

[54] KEYBOARD FOR AN ELECTRONIC DEVICE

[75] Inventor: Myung-Sub An, Kyunggi-do, Rep. of Korea

[73] Assignee: LG Electronics Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,466

[22] Filed: Oct. 9, 1997

[30] Foreign Application Priority Data

Oct. 9, 1996 [KR] Rep. of Korea ...................... 96-33207

[51] Int. Cl.[7] .................................................. H03K 17/94
[52] U.S. Cl. ............................. 341/22; 341/20; 345/172; 400/486
[58] Field of Search ........................ 341/22, 20; 345/168, 345/172; 400/486, 489

[56] References Cited

U.S. PATENT DOCUMENTS 5,318,367  6/1994  Braun et al. ............................... 341/22
5,584,588  12/1996  Harbaugh ................................ 400/486
5,739,776  4/1998  Chen ........................................ 341/22

*Primary Examiner*—Michael Horabik
*Assistant Examiner*—Timothy Edwards, Jr.

[57] ABSTRACT

The present invention provides a keyboard arrangement having a Subkey that functions as an Enter key. The Subkey is provided between right and left groups of main keys to permit quicker and more comfortable data input by allowing a user to use activate an "Enter" command using either thumb by depressing the Subkey. A Number-Lock lamp 4, a Caps-Lock lamp 5 and a Scroll-Lock lamp 6 may be also provided in the space between the right and left groups of keys for easy observation of the keyboard status.

12 Claims, 3 Drawing Sheets

KEYBOARD FOR AN ELECTRONIC DEVICE

FIELD OF THE INVENTION

The present invention relates to a keyboard apparatus for an electronic device, and more particularly to a keyboard apparatus for a computer which facilitates prompt and comfortable data input by allowing a user to operate an enter key on the computer keyboard with either thumb.

BACKGROUND OF THE INVENTION

Generally, a conventional computer keyboard as shown in FIG. 1 is arranged with 106 keys. Most conventional keyboards have a horizontally rectangular shape. There are also keyboards having partial curvilinear shapes which bend from (1) right to left or (2) from the top to the center of the keyboard. Conventional keyboard structures, as shown in FIG. 1, have two enter keys 2a, 2b, which are the most frequently used keys when inputting data. Enter key 2a is located to the right of the letter keys and Enter key 2b is located at the bottom right corner of the keyboard as part of the number pad. Such a key arrangement restricts a user to operating the Enter keys with only his/her right hand. Thus, a primary problem with conventional keyboard structures is that the keyboard arrangement causes considerable discomfort to users by restricting operation of the Enter key to the right hand only. Further, the key arrangement reduces the speed and efficiency of keyboard data entry by delegating one of the frequently used keys to isolated areas of the conventional keyboard.

SUMMARY OF THE INVENTION

The present invention is directed to solve the above-described problems with conventional keyboards. An object of the invention is to provide a keyboard apparatus for a computer (or other electronic apparatus) having a keyboard arrangement in which the Enter key can be depressed by either thumb of the user's hands for faster and more comfortable data input.

A further object of the invention is to provide a keyboard apparatus for a computer (or other electronic apparatus) having an ergonomically improved keyboard arrangement capable of reducing a user's wrist fatigue. To achieve the above-described objects, a keyboard apparatus for a computer (or other electronic apparatus) according to the present invention is provided with main keys (including a string of letter, function and number keys) and a Subkey located near the center portion of the keyboard. The Subkey serves as an alternate Enter key for controlling operation of a program in connection with the main keys and for controlling the entry of numbers or characters output by the main keys. In one embodiment, the main keys are divided into a right half portion and a left half portion with the subkey positioned in a substantially symmetrical relationship relative to the two groups of main keys.

Further, a keyboard apparatus for a computer according to the present invention is provided with main keys and number keys with a Subkey which is provided in the center portion of the keyboard, wherein the right half portion and the left half portion of the main keys are positioned in a substantially symmetrical relationship to the Subkey and whereby, in operation, said Subkey is positioned for enabling the user to depress the Subkey with either the right and/or left thumb of his/her hands.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
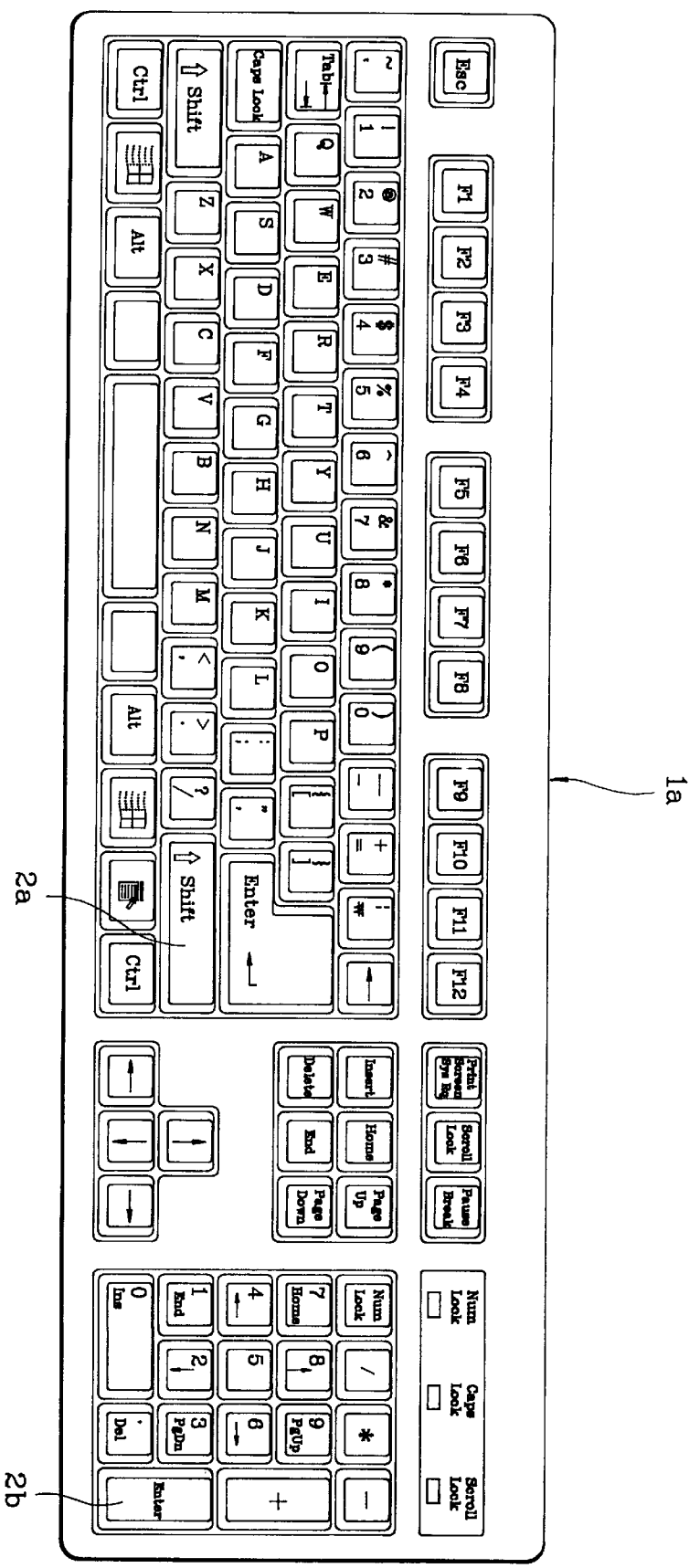
FIG. 1 is a plan view showing a conventional computer keyboard arrangement.
Figure 2:
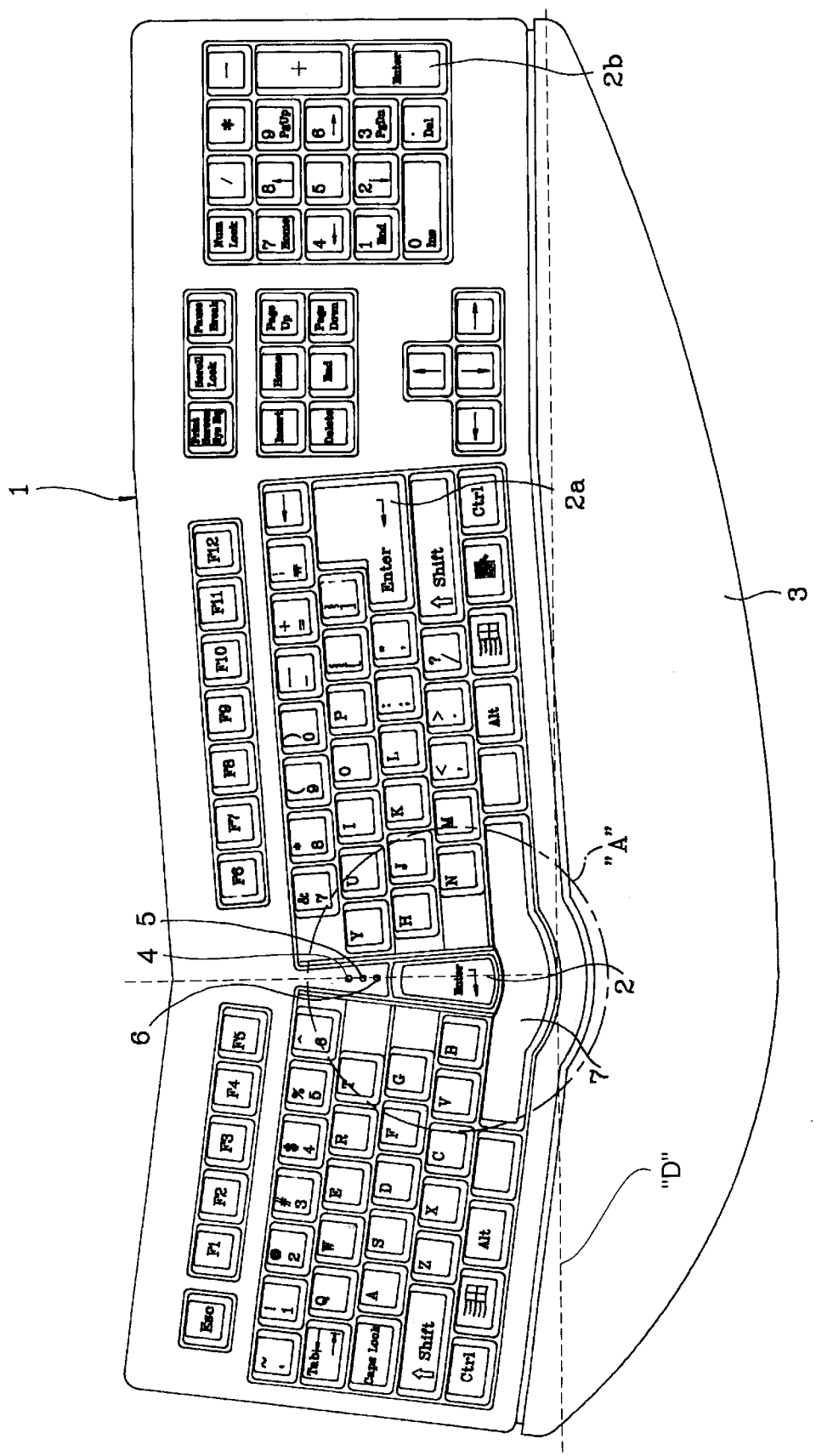
FIG. 2 is a plan view showing the keyboard arrangement of the present invention.
Figure 3:
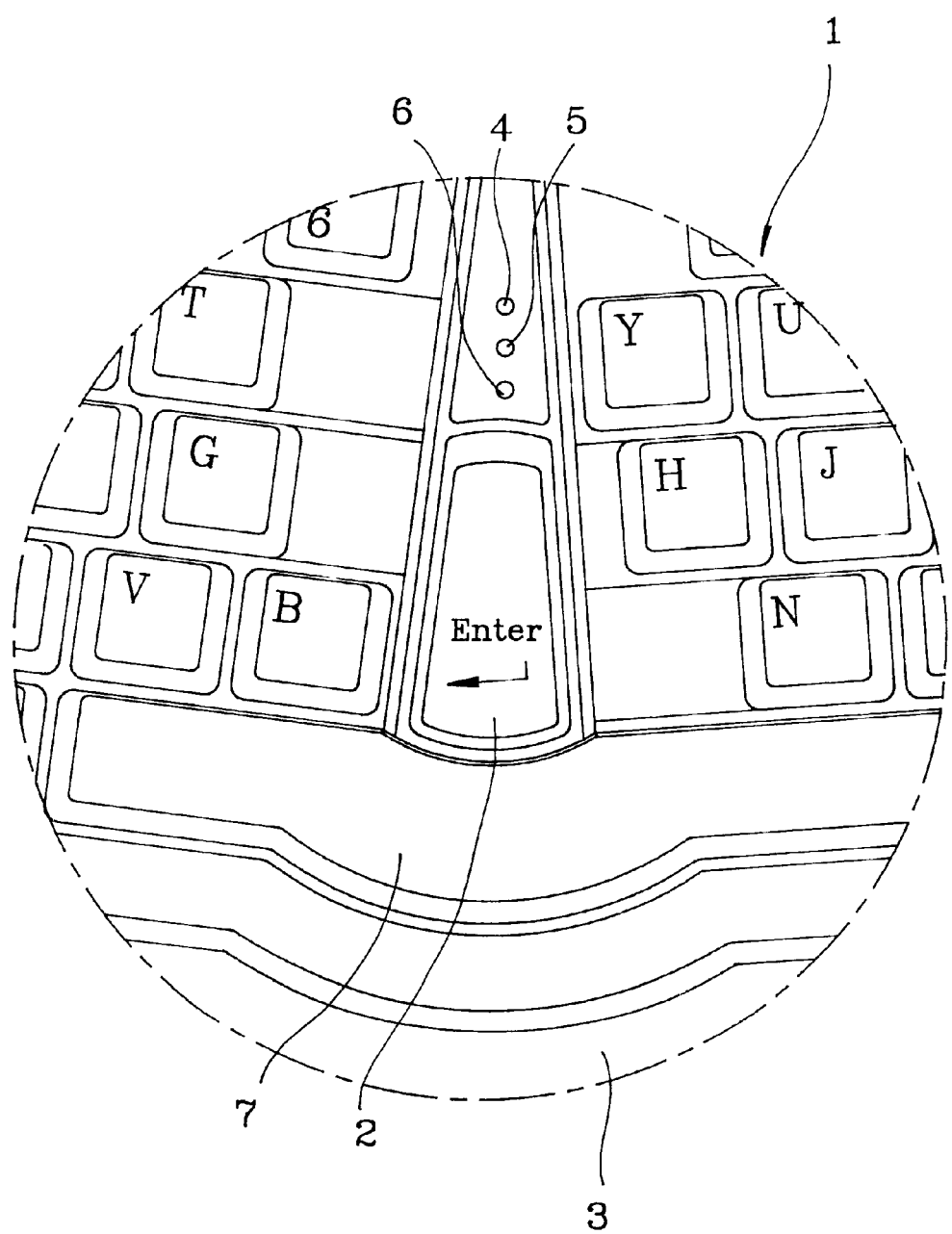
FIG. 3 is a sectional enlargement of Section "A" as shown in FIG. 2.

Preferred embodiments of the present invention are illustrated in FIGS. 2 and 3 and are described in detail as follows:

FIG. 2 shows a keyboard 1 according to a preferred embodiment of the present invention. Similar to conventional keyboards, keyboard 1 has a plurality of main keys strategically arranged including letter keys, number keys and function keys. The main keys occupy a substantial portion of the keyboard 1. A number pad 10 is located in the right most portion of the keyboard. Finally, some miscellaneous control keys are located between the main keys and the number pad.

As in a conventional keyboard, the preferred embodiment of the invention has multiple Enter keys. The first Enter key 2a is located as part of and in the right hand section of the main keys. The Enter key 2a is typically depressed using the right most finger of the right hand ("little finger") when an operator's hands are in position on the keyboard for typing. The second Enter key 2b is located with the number pad 10. The Enter key 2b is positioned in the number pad 10 to provide for quick and efficient input of numerical data. The keys are arranged similar to a conventional calculator.

As contrasted with conventional keyboards, the keyboard arrangement of the present invention is provided with a Subkey 2 which functions as an additional Enter key. The Subkey 2 is strategically positioned at about the center of and among the letter keys of the keyboard 1 to permit a user to easily depress the Enter key using either of his/her thumbs. With hands in a typing position, a user has two options of entering data using either left/right thumb or the little finger of the right hand. Since a person's thumb is typically stronger and easier to control than the little finger, the Subkey 2 provides a useful tool to entering data.

In one embodiment, it is desirable for the Subkey 2 to have a shape similar to a trapezoid. In the embodiment shown in FIG. 2, the trapezoid shaped key maximizes the size of the key surface by filling the space between the right and left portions of main keys near the space bar 7. While other key shapes may be used, the trapezoid shaped key provides easy access and minimizes any unoccupied space on the keyboard. An enlarged view of the trapezoid shaped Subkey 2 is shown in FIG. 3.

A wrist support 3 is attached to the keyboard 1 at one end to reduce wrist fatigue. The wrist support 3, as shown in FIG. 2, extends along the entire length of one side of the keyboard for supporting a user's hands in the typing position. In one embodiment, the wrist support is curved with respect to the keyboard to have its greatest width at about the dividing line between the main keys.

An additional feature of the keyboard 1 is indicator lamps located in the open space between the main keys and above the Subkey 2 as shown in FIG. 3. A Number-Lock lamp 4, a Caps-Lock lamp 5 and a Scroll-Lock lamp 6 may be provided above the Subkey 2 at about the center of the letter keys to facilitate easy observation of the status of selected keyboard functions. The position and arrangement of the above-described lamps are not restricted by the illustrated and described embodiment and can be provided in any order. Further, the above-described lamps can be provided in place of or in addition to other indicator lamps located at more conventional positions on a keyboard.

In the illustrated embodiment, the keyboard 1 is angled at about 20 degrees with respect to a datun live "D" and around the Subkey 2. Most conventional keyboards have no curvature with the main keys disposed in parallel. While there are conventional keyboards with curvature of as much as 10 degrees, in actual operation, an angle of about 20 degrees is more comfortable. Thus, the disclosed keyboard is better designed for user comfort.

As shown in FIG. 2, the main keys on the keyboard 1 are divided into right and left side groups corresponding to the user's two hands. Namely, the keys including the F6, 7, Y, H, and N keys (and all keys to the right of those keys) define the right side group. The keys including the F5, 6, T, G, and B keys (and all keys to the left of those keys) define the left side group. The letter keys on the right side and on the left side of the keyboard are so segregated and angled upwardly providing a space therebetween for the Subkey 2 and indicator lamps.

Between the left and right side groups of keys is the Space Bar 7. The Space Bar 7 is angled to correspond to the angle of the keys (in the preferred embodiment, 20 degrees) and extends between the right and left groups of keys. Like conventional keyboards, the Space Key 7 is positioned between the center most keys from both groups of keys. Because The Space Bar 7 is angled, respective portions of the Space Bar 7 are aligned in parallel with the left and right groups of keys.

With a conventional keyboard arrangement, when the Enter key 2a is pressed, a corresponding matrix code is output by a conventional keyboard matrix circuit (not shown). This code represents the position of the Enter key 2a and is converted to a key code value (for example, F05A for "Enter"), which in turn is sent to the computer. Meanwhile, another matrix code which represents the position of the Enter key is converted to a different code value (for example, E05A.)

With the keyboard arrangement of the present invention, the Subkey 2 functions as an Enter key. As a result, both the Subkey 2 and the Enter key 2a have matrix codes which are converted into same key code (for example, F05A) which in turn is sent to the computer. The Enter key 2b at the bottom of the right corner of the keyboard has a matrix code that is converted into a different key code value (i.e., E05A) which in turn is sent to the computer.

Thus, when the computer scans the keyboard of the present invention, the key code value of the Subkey 2 can be read in the same manner as the Enter key 2a. Therefore, the Subkey 2 may be used interchangeably with the other Enter keys 2a and 2b. In the preferred embodiment illustrated in FIGS. 2 and 3, each of the Enter key 2a, Enter key 2b and Subkey 2 have unique benefits from their respective locations on the keyboard. In this regard, the Enter key 2b located at the bottom right corner of the keyboard 1 is conveniently used with the number pad 10. The Enter key to right of the letter keys can be used conventionally. Finally, the Subkey 2 can be used as the primary Enter key or a supplement to the other Enter keys.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A keyboard for an electronic device, comprising:
   a base having partial curvilinear shape;
   a plurality of main keys disposed on said base, said plurality of main keys having a right side key group and a left side key group, wherein the arrangement of the right and left side key groups are aligned on the base at an angle greater than 0 degrees with respect to a datum;
   a first ENTER key being disposed in the right key group;
   a second ENTER key being disposed in a number pad; and
   a third ENTER key positioned on said base and in a space between the right and left side key groups, for causing an "ENTER" command to be inputted to a computer upon depressing the third ENTER key.

2. A keyboard as recited in claim 1, wherein the third ENTER key is a subkey having a trapezoidal shape.

3. A keyboard as recited in claim 1, further comprising:
   at least one indicator light located on said base in the space between the right and left side key groups.

4. A keyboard as recited in claim 1, wherein the subkey and the first enter key have the same matrix codes.

5. A keyboard as recited in claim 1, further comprising a number pad including a plurality of number keys and a second enter key.

6. A keyboard as recited in claim 1, wherein:
   the keys in the right and left side key groups are aligned on the base at an acute angle of greater than 10 degrees with respect to the datum.

7. A keyboard as recited in claim 6, wherein:
   the keys in the right and left side key groups are aligned on the base at an angle of less than 20 degrees with respect to the datum.

8. A keyboard as recited in claim 1, further comprising:
   a wrist support attached to a side of the keyboard for supporting a user's wrists when in the typing position.

9. A keyboard as recited in claim 8, wherein said wrist support having a curved outer edge with a maximum width approximately adjacent to the space bar.

10. A keyboard as recited in claim 1, further comprising:
    a space bar located between an edge of the base and a portion of both the right and left key groups.

11. A keyboard as recited in claim 10, wherein the space bar is curved.

12. A keyboard as recited in claim 10, wherein the space bar is angled.

* * * * *